(12) United States Patent
Sato et al.

(10) Patent No.: US 11,378,766 B2
(45) Date of Patent: Jul. 5, 2022

(54) OPTICAL FIBER CABLE

(71) Applicant: SUMITOMO ELECTRIC INDUSTRIES, LTD., Osaka (JP)

(72) Inventors: Fumiaki Sato, Osaka (JP); Kuushin Ryan, Osaka (JP); Taro Fujita, Osaka (JP); Nayu Yanagawa, Osaka (JP); Ryota Fukumoto, Osaka (JP); Masakazu Takami, Osaka (JP); Yohei Suzuki, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 17/290,315

(22) PCT Filed: Nov. 6, 2019

(86) PCT No.: PCT/JP2019/043542
§ 371 (c)(1),
(2) Date: Apr. 30, 2021

(87) PCT Pub. No.: WO2020/095958
PCT Pub. Date: May 14, 2020

(65) Prior Publication Data
US 2022/0003949 A1    Jan. 6, 2022

(30) Foreign Application Priority Data

Nov. 6, 2018    (JP) .............................. JP2018-209242
Jun. 4, 2019    (JP) .............................. JP2019-104512

(51) Int. Cl.
*G02B 6/44*    (2006.01)

(52) U.S. Cl.
CPC ......... *G02B 6/4403* (2013.01); *G02B 6/4432* (2013.01); *G02B 6/4438* (2013.01)

(58) Field of Classification Search
CPC ... G02B 6/4403; G02B 6/4432; G02B 6/4438
USPC .......................................................... 385/114
See application file for complete search history.

(56) References Cited

U.S. PATENT DOCUMENTS

| | | |
|---|---|---|
| 4,770,489 A | 9/1988 | Saito et al. |
| 5,201,020 A | 4/1993 | Kannabiran |
| 6,785,450 B2 | 8/2004 | Wagman et al. |
| 6,839,494 B2 | 1/2005 | Clatanoff et al. |
| 7,050,688 B2 | 5/2006 | Lochkovic et al. |
| 8,457,461 B2 | 6/2013 | Ott |

(Continued)

FOREIGN PATENT DOCUMENTS

| | | |
|---|---|---|
| JP | S55-041882 U | 3/1980 |
| JP | H10-133074 A | 5/1998 |

(Continued)

*Primary Examiner* — Jerry M Blevins
(74) *Attorney, Agent, or Firm* — Faegre Drinker Biddle & Reath LLP

(57) ABSTRACT

An optical fiber cable includes a plurality of intermittently connected optical fiber ribbons inside a cable sheath, in which a fibrous filler or an FRP using the fibrous filler is provided on at least one pair of diagonals of the two diagonal directions approximately orthogonal to each other inside the cable sheath. An average linear expansion coefficient of the fibrous filler at −40° C. to +70° C. is smaller than an average linear expansion coefficient of the cable sheath at −40° C. to +70° C.

13 Claims, 5 Drawing Sheets

(56) References Cited

U.S. PATENT DOCUMENTS

| | | |
|---|---|---|
| 8,879,878 B2 | 11/2014 | Bigot-Astruc et al. |
| 9,052,459 B2 | 6/2015 | Compton et al. |
| 9,176,292 B2 | 11/2015 | Cody et al. |
| 2001/0038739 A1 | 11/2001 | Jamet |
| 2006/0291787 A1 | 12/2006 | Seddon |
| 2010/0189396 A1* | 7/2010 | Hashimoto ............ G02B 6/443 385/112 |
| 2011/0110635 A1* | 5/2011 | Toge ...................... G02B 6/441 385/102 |
| 2012/0288245 A1 | 11/2012 | Hurley et al. |
| 2013/0051742 A1 | 2/2013 | Blackwell et al. |
| 2017/0153404 A1* | 6/2017 | Takeda et al. |
| 2019/0154934 A1* | 5/2019 | Cheng .................. G02B 6/4486 |
| 2020/0257057 A1 | 8/2020 | Lu et al. |
| 2021/0278616 A1 | 9/2021 | Ohno et al. |

FOREIGN PATENT DOCUMENTS

| | | | |
|---|---|---|---|
| JP | 2004-184539 A | 7/2004 | |
| JP | 2006-023503 A | 1/2006 | |
| JP | 2009/244288 A | 10/2009 | |
| JP | 2010-8923 A | 1/2010 | |
| JP | 2014-071441 A | 4/2014 | |
| JP | 2015-517679 A | 6/2015 | |
| JP | 2017-097089 A | 6/2017 | |
| WO | WO-2004102244 A1 * | 11/2004 | ........... G02B 6/4434 |
| WO | WO-2013/165407 A1 | 11/2013 | |
| WO | WO-2018/092880 A1 | 5/2018 | |

* cited by examiner

FIG.3

| SAMPLE NO. | SHEATH CROSS-SECTIONAL AREA S (mm^2) | SHEATH YOUNG'S MODULUS E (kgf/mm^2) | ES PRODUCT (kgf) | FLAT PLATE LATERAL PRESSURE (500N/100mm) | LOSS INCREASE DUE TO -40°C SHEATH SHRINKAGE |
|---|---|---|---|---|---|
| 1 | 11.8 | 90 | 1062 | IMPOSSIBLE (0.5dB) | GOOD (0.02dB/km) |
| 2 | 12.0 | 110 | 1320 | GOOD (0.09dB) | GOOD (0.05dB/km) |
| 3 | 13.5 | 90 | 1215 | GOOD (0.1dB) | GOOD (0.04dB/km) |
| 4 | 30.0 | 90 | 2700 | GOOD (0.05dB) | GOOD (0.09dB/km) |
| 5 | 30.0 | 240 | 7200 | GOOD (0.01dB) | GOOD (0.12dB/km) |
| 6 | 60.0 | 240 | 14400 | GOOD (0.00dB) | GOOD (0.15dB/km) |
| 7 | 65.0 | 240 | 15600 | GOOD (0.00dB) | IMPOSSIBLE (0.17dB/km) |

OPTICAL FIBER CABLE

TECHNICAL FIELD

The present disclosure relates to an optical fiber cable.

This application is based upon and claims the benefit of priority from Japanese Patent Application No. 2018-209242, filed on Nov. 6, 2018 and Japanese Patent Application No. 2019-104512, filed on Jun. 4, 2019, the entire contents of which are incorporated herein by reference.

BACKGROUND ART

In a related art, a FTTH trunk optical fiber cable uses, for example, a loose tube type optical fiber cable mainly used overseas (refer to Patent Literature 1), a slot type optical cable on which an optical fiber ribbon including an intermittent notch is mounted (refer to Patent Literature 2), or a slotless type optical cable on which the optical fiber ribbon including the intermittent notch is mounted (refer to Patent Literature 3).

CITATION LIST

Patent Literature

Patent Literature 1: Published unexamined Japanese patent application based on international application 2015-517679

Patent Literature 2: Published unexamined Japanese patent application 2014-71441

Patent Literature 3: Published unexamined Japanese patent application 2010-8923

SUMMARY OF INVENTION

According to one aspect of the present disclosure, an optical fiber cable including a plurality of intermittently connected optical fiber ribbons inside a cable core, in which a cable sheath is placed around an outside of the cable core, the cable including: a plurality of pairs of fillers in two diagonal directions orthogonal to each other in a cross-sectional view of the cable sheath, where a fibrous filler or an FRP using the fibrous filler is arranged on at least one pair of diagonals of the fillers, and an average linear expansion coefficient of the fibrous filler at −40° C. to +70° C. is smaller than an average linear expansion coefficient of the cable sheath at −40° C. to +70° C.

BRIEF DESCRIPTION OF DRAWINGS

FIG. 3 is a diagram illustrating various cable sheath conditions and characteristic evaluation results.

DESCRIPTION OF EMBODIMENTS

Technical Problem

Figure 1:
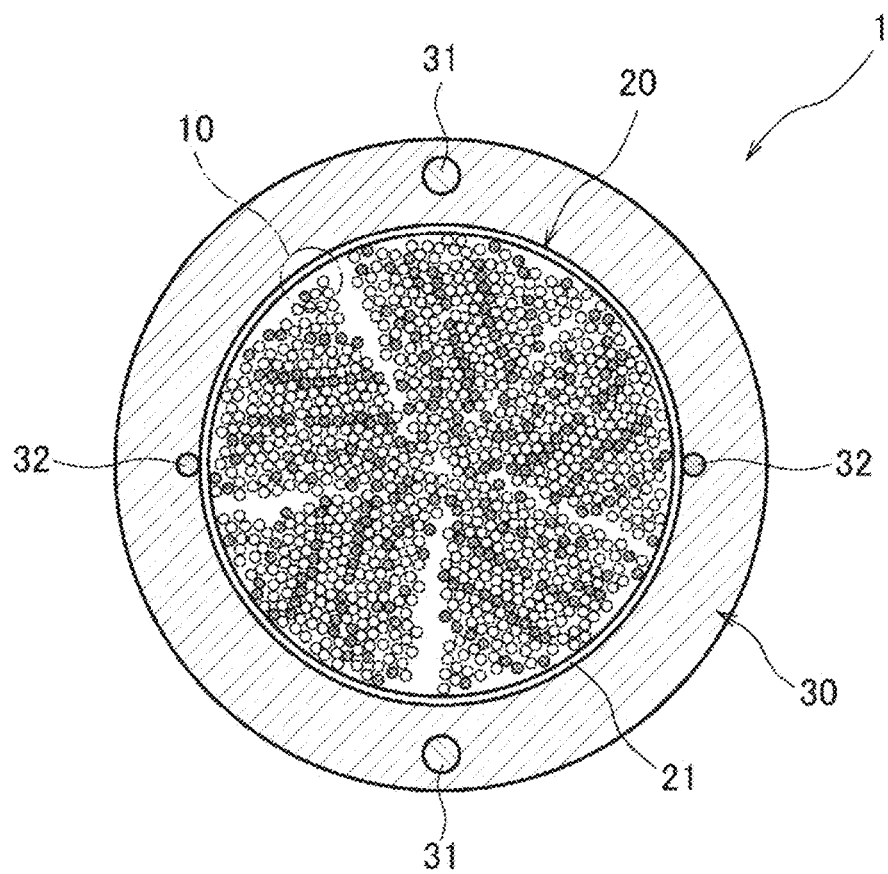
FIG. 1 is a cross-sectional view of an optical fiber cable according to a first embodiment of the present disclosure.

In a related-art loose tube cable, in a case where an optical fiber is split in the middle, a tube is classified by color and can be easily taken out. However, there is a problem that it is difficult to increase density of the optical fiber due to a thickness of the tube. In a slot type optical cable, a thickness of a cable sheath can be made thin, and since a skeleton is provided inside the slot type optical cable, a kink (twist) hardly occurs. However, there is a problem that it is difficult to achieve a high density and a light weight due to an occupied area of a slot member.

On the other hand, in a slotless type optical cable, an optical fiber ribbon is housed at a high density, such that the optical fiber ribbon can be mounted at a relatively high density. However, since tension members such as a steel wire, a fiber reinforced plastic (FRP), or the like are provided on opposite sides of the cable sheath, there is a problem that the slotless type optical cable has bending direction such that it is difficult to house an excess length of the cable. In a case where the cable is bent in a diagonal direction with respect to the tension member, bending rigidity of the cable becomes small, so that there is a problem that the kink or the like is likely to occur during laying in a case where an inner diameter of the cable is large. Particularly, in a case where an optical fiber cable for pneumatic feeding has the above-described slotless type optical cable structure, bending anisotropy occurs, so that in a case where the pneumatic feeding and pushing are performed in a duct, it is easy to be bent in a direction in which the bending rigidity is low, and there is a risk of buckling in the middle of the duct. The optical fiber cable for the pneumatic feeding is desired to have a small diameter and a light weight in order to mount the optical fiber at a high density, but in a case where the sheath thickness is made thin, only a thin tensile strength member can be put in the sheath, so that the rigidity of the optical fiber cable deteriorates. Since the skeleton is not provided inside the cable, there is also a problem that the cable sheath is likely to shrink at low temperature and attenuation at low temperature is likely to increase.

The present disclosure has been made in consideration of the above-described circumstances, and an object thereof is to provide a slotless type optical cable that prevents shrinkage of a cable sheath at low temperature, has a light weight with a small diameter, and has a high density.

Advantageous Effects of the Present Disclosure

According to the present disclosure, it is possible to obtain a slotless type optical fiber cable that prevents shrinkage of a cable sheath at low temperature, has a light weight with a small diameter, and has a high density.

Description of Embodiments of the Present Disclosure

First, embodiments of the present disclosure will be listed and described.

(1) According to one aspect of the present disclosure, an optical fiber cable including a plurality of intermittently connected optical fiber ribbons inside a cable core, in which a cable sheath is placed around an outside of the cable core, the cable including: a plurality of pairs of fillers in two diagonal directions orthogonal to each other in a cross-sectional view of the cable sheath, where a fibrous filler or an FRP using the fibrous filler is arranged on at least one pair of diagonals of the fillers, and where an average linear expansion coefficient of the fibrous filler at −40° C. to +70° C. is smaller than an average linear expansion coefficient of the cable sheath at −40° C. to +70° C.

According to the above-described configuration, in a slotless type optical fiber cable, it is possible to obtain an optical fiber cable that prevents shrinkage of the cable sheath at low temperature, has a light weight with a small diameter, and has a high density.

(2) It is desirable that the average linear expansion coefficient of the fibrous filler at −40° C. to +70° C. is less than $1\times10^{-5}$/° C. (3) It is desirable that a part or all of the fibrous fillers have a negative linear expansion coefficient. (4) A part or all of the fibrous fillers may be at least any one of an aramid fiber, a liquid crystal polymer, and a glass fiber. According to the above-described configuration, since the fibrous filler whose average linear expansion coefficient is small is used, it is possible to prevent shrinkage of the cable sheath at the low temperature of the optical fiber cable.

(5) It is desirable that the average linear expansion coefficient of the cable sheath at −40° C. to +70° C. is $4.5\times10^{-4}$/° C. or less. According to the above-described configuration, since the cable sheath whose average linear expansion coefficient is small is used, it is possible to prevent shrinkage of the cable sheath at the low temperature of the optical fiber cable.

(6) It is desirable that ES product obtained by multiplying Young's modulus E of the cable sheath by a cross-sectional area S of the cable sheath is 1,320 to 14,440 kgf (12.9 to 141 kN). According to the above-described configuration, an optical fiber cable having a good lateral pressure characteristic can be obtained.

(7) It is desirable that a thickness of the cable sheath is 0.5 mm or more. According to the above-described configuration, a shape of the cable sheath can be desirably maintained when the cable sheath is extruded.

(8) It is desirable that the number of fibrous fillers is 4 or more, two pairs of the two fibrous fillers paired at positions facing each other with a center of the optical fiber cable interposed therebetween in the cross-sectional view are provided, and the positions of the four fibrous fillers in the cross-sectional view are positions where two straight lines respectively connecting the two paired fibrous fillers are orthogonal to each other. According to the above-described configuration, since four tensile strength members are provided in a well-balanced manner inside the cable sheath, bending anisotropy (bias in a bendable direction) of the optical fiber cable can be suppressed. As a result, when the optical fiber cable having the above-described structure is used for an optical fiber cable for pneumatic feeding, the optical fiber cable can satisfactorily perform the pneumatic feeding.

(9) It is desirable that the fibrous filler is a plate-shaped member in which a cross section of the fibrous filler is formed in a circular arc shape along a curved surface of the cable sheath. According to the above-described configuration, since the tensile strength member is embedded inside the cable sheath over a large angle when viewed from the center of the cable sheath, the bending anisotropy of the optical fiber cable can be suppressed. As a result, in a case where the optical fiber cable having the above-described structure is used for the optical fiber cable for pneumatic feeding, the optical fiber cable can satisfactorily perform the pneumatically feeding.

(10) It is desirable that the cable sheath includes a protrusion protruding in a radial direction of the optical fiber cable at an outer peripheral portion. According to the above-described configuration, since the protrusion protruding in the radial direction of the optical fiber cable is provided on the outer peripheral portion of the cable sheath, a contact area between the cable sheath and a duct can be reduced in a case where the optical fiber cable having the above-described structure is used as the optical fiber cable for the pneumatic feeding, and in a case where the optical fiber cable is pneumatically fed into the duct. As a result, friction between the cable sheath and the duct is reduced, and a pneumatically feeding distance can be extended.

(11) It is desirable that an end portion of the protrusion in a direction in which the protrusion protrudes is configured to have a curved surface, and a curvature radius of the curved surface is 2.5 mm or more. According to the above-described configuration, the end portion in the direction in which the protrusion protrudes is configured to have the curved surface, and the curvature radius thereof is 2.5 mm or more, so that the end portion has a gentle shape. As a result, in a case where the optical fiber cable is inserted into a wiring member such as a closure or the like, it is possible to prevent deterioration in airtightness due to unevenness by the protrusion portion. Therefore, water intrusion into the closure and the like can be suppressed.

(12) It is desirable that the optical fiber cable is used as a air-blown optical cable.

First Embodiment

Hereinafter, embodiments related to an optical fiber ribbon of the present disclosure will be described with reference to the drawings. In the following description, since a configuration denoted by the same reference sign even in a different drawing is regarded as the same configuration, the description thereof may be omitted. The present disclosure is not limited to examples in the embodiments, and includes all the modifications within the scope of matters described in the scope of the claims and within the scope equivalent thereto. As long as a combination of a plurality of embodiments can be performed, the present disclosure includes a combination of any embodiments.

Figure 2:
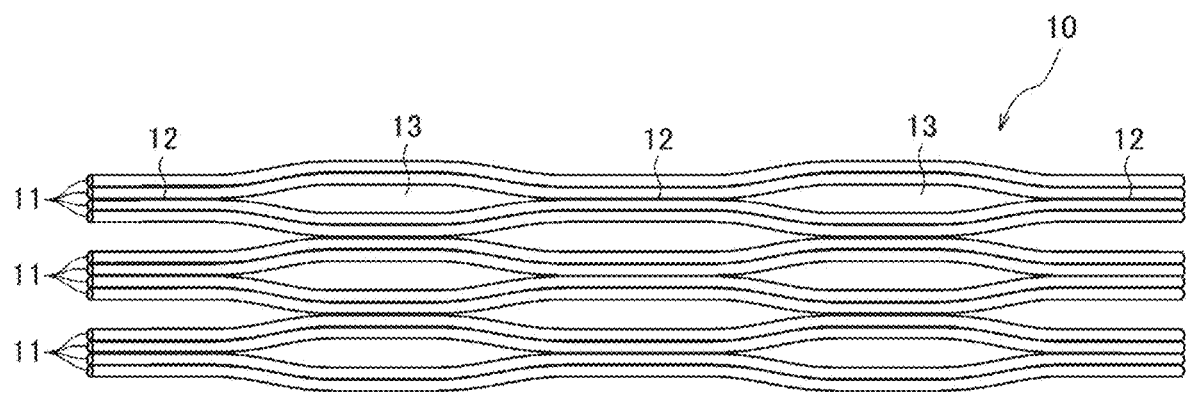
FIG. 2 is a diagram illustrating an intermittently connected optical fiber ribbon housed in the optical fiber cable.

FIG. 1 is a cross-sectional view of an optical fiber cable according to a first embodiment of the present disclosure, and FIG. 2 is a diagram illustrating an intermittently connected optical fiber ribbon housed in the optical fiber cable. An optical fiber cable 1 illustrated in FIG. 1 is a slotless type, and includes, for example, a round type cable core 20 and a cable sheath 30 formed around a periphery of the cable core 20. The cable core 20 houses, for example, 1,800 cores by using 150 pieces of intermittently connected optical fiber ribbons (hereinafter, also referred to as an "intermittent ribbon") 10 including 12 cores. In an example in the drawing, 30 pieces of the intermittent ribbons 10 are bundled together with a rough winding string (not illustrated) or the like to form a unit, and five units thereof are formed.

As illustrated in FIG. 2, the intermittent ribbon 10 is formed by arranging a plurality of optical fibers 11 in a parallel row and intermittently connecting adjacent optical fibers by a connecting portion 12 and a non-connecting portion 13. Specifically, an example illustrated in FIG. 2 illustrates a state in which the intermittent ribbon 10 is opened in an arrangement direction, and the intermittent ribbon 10 is configured by arranging the optical fibers 11 including 12 cores in a parallel row and by allowing every two cores to intermittently adhere to each other. The intermittent ribbon 10 may not be provided with the connecting portion 12 and the non-connecting portion 13 for every two cores, and, for example, may be intermittently connected by the connecting portion 12 and the non-connecting portion 13 for each core.

The optical fiber 11 arranged as the intermittent ribbon 10 is formed by further applying color coating to an outside of an optical fiber in which a glass fiber having a standard outer diameter of 125 μm is coated with a coating outer diameter of about 250 μm. The optical fiber 11 is not limited thereto, and may be a small-diameter fiber having a coating outer diameter in a range of 135 μm to 220 μm, for example, about 165 μm or 200 μm. High-density mounting becomes much easier by using the small-diameter fiber.

As illustrated in FIG. 1, for example, the cable core 20 is formed in a round shape by longitudinally wrapping or spirally wrapping five units obtained by bundling 30 pieces of the intermittent ribbons 10 with a wrapping tape 21. The respective units have a structure stranded in one direction or by SZ stranding. Here, the intermittent ribbon 10 can be freely deformed in the cable core 20, which is effective for achieving high density.

An outside of the wrapping tape 21 is covered with the cable sheath 30 formed of, for example, linear low density polyethylene (L-LDPE), or high density polyethylene (HDPE), or the like. A linear expansion coefficient of the cable sheath 30 itself is desirably $4.5 \times 10^{-4}$/° C. or less in an operating temperature range of $-40$° C. to $+70$° C. In the cable sheath 30, a pair of fibrous fillers are respectively provided in each of two diagonal directions that are approximately orthogonal to each other in a cross section of the cable sheath 30. A first fibrous filler 31 is longitudinally wrapped and embedded in at least one pair of diagonals during extrusion molding of the cable sheath 30. A second fibrous filler 32 serving as a tear string at the time of tearing the cable sheath 30 is longitudinally wrapped and embedded in the other pair of diagonals during the extrusion molding of the cable sheath 30. In the present disclosure, the term "approximately orthogonal to each other" includes a state of deviating by several degrees from a state of being orthogonal to each other at 90°.

The first fibrous filler 31 not only serves as a tension member, but also plays a role of preventing sheath shrinkage during shrinkage at low temperature, and it is desirable that the first fibrous filler 31 is a material having an average linear expansion coefficient smaller than an average linear expansion coefficient of the cable sheath 30 itself. As the material of the first fibrous filler 31, an aramid fiber having a negative linear expansion coefficient, a liquid crystal polymer having a low linear expansion coefficient (about $0.5 \times 10^5$/° C.), a glass fiber, or the like are desirably used as a part or all of the first fibrous filler 31. The linear expansion coefficient of the first fibrous filler 31 at $-40$° C. to $+70$° C. is desirably less than $1 \times 10^{-5}$/° C. The first fibrous filler 31 may be embedded as a fiber with a fiber reinforced plastic (FRP). In the present disclosure, the FRP using the fibrous filler indicates the fiber reinforced plastic (FRP) using the fibrous filler as a fiber. In this case, a part of the first fibrous filler 31 may be formed of any one of the aramid fiber, the liquid crystal polymer, and the glass fiber.

In order to serve as the tear string at the time of tearing the cable sheath 30, it is desirable that the second fibrous filler 32 is embedded in contact with the wrapping tape 21 or in a location close to the wrapping tape 21. For example, the same material as that of the first fibrous filler 31 can be used as a material of the second fibrous filler 32. In this case, since the fibrous fillers having the same material exist at four locations of two pairs of diagonals, anisotropy in a bending direction is suppressed when the cable is bent, thereby improving bending directionality. As a result, a kink at the time of laying the optical fiber cable can be prevented. The second fibrous filler 32 may not be formed of the FRP because the second fibrous filler 32 requires flexibility.

FIG. 3 is a diagram illustrating various cable sheath conditions and characteristic evaluation results. In order to achieve a good lateral pressure characteristic of the optical fiber cable and to suppress the shrinkage at low temperature, in a case where ES product is changed in various ways, when a cross-sectional area of a portion of the cable sheath 30 is defined as S and Young's modulus is defined as E, an increase in loss due to flat plate lateral pressure and sheath shrinkage is evaluated. As the flat plate lateral pressure, an increase amount of transmission loss [dB] in a case where a weight of 500 N is applied to the extended optical fiber cable over a length of 100 mm is obtained. As the increase in loss due to the sheath shrinkage, the increase amount of the transmission loss [dB] in a case where a temperature is changed from a room temperature to $-40$° C. is obtained. The ES product of the sheath is related to the flat plate lateral pressure, and as the ES product is smaller, the optical fiber cable is softer and thinner, so that the optical fiber cable becomes weaker to the lateral pressure. The ES product is also related to attenuation at low temperature, and as the ES product is larger, the sheath shrinkage becomes larger, so that a low temperature characteristic become worse.

As the optical fiber cable, regarding seven examples of samples 1 to 7, an aramid FRP having a diameter of 0.5 mm is used as the first fibrous filler 31 of a pair of diagonals. In order to maintain a good shape of the cable sheath 30 when the cable sheath 30 is extruded, a thickness of the cable sheath is 0.5 mm or more, and 2.0 mm or less from a viewpoint of reducing a diameter of the optical fiber cable 1. A material for the cable sheath 30 of the samples 1, 3, and 4 is a low-density polyethylene having the Young's modulus of 90 (kgf/mm$^2$), and an average linear expansion coefficient at $-40$° C. to $+70$° C. is $4.5 \times 10^{-4}$/° C. A material of the cable sheath 30 of the sample 2 is medium-density polyethylene having the Young's modulus of 110 (kgf/mm$^2$), and the average linear expansion coefficient at $-40$° C. to $+70$° C. is $4.0 \times 10^{-4}$/° C. A material of the cable sheath 30 of the samples 5, 6 and 7 is high-density polyethylene having the Young's modulus of 240 (kgf/mm$^2$), and the average linear expansion coefficient at $-40$° C. to $+70$° C. is $3.7 \times 10^4$/° C.

Next, in a flat plate lateral pressure test, 0.1 dB or less is determined to be "good", and a value exceeding 0.1 dB is determined to be "impossible". In the case of the increase in loss due to the shrinkage, 0.15 dB/km or less is determined to be "good", and a value exceeding 0.15 dB/km is determined to be "impossible". As a result, as illustrated in FIG. 3, in the sample 1, since the cross-sectional area of the cable sheath 30 is small, the increase in loss due to the sheath shrinkage is the smallest. However, since the ES product is small, strain with respect to stress becomes large, the loss due to an average lateral pressure exceeds 0.1 dB, which causes "impossible". In the sample 7, since the ES product is large, the strain with respect to the stress is small, and a lateral pressure characteristic is good. However, since the cross-sectional area of the sheath portion is large, the increase in loss due to the shrinkage of the cable sheath 30 becomes large, which causes "impossible".

Next, regarding the samples 2 to 6 excluding the samples 1 and 7, the increase in loss due to the flat plate lateral pressure and the increase in loss due to the sheath shrinkage are good. As a result, it can be seen that when the ES product is between 1,320 and 14,400 kgf (12.9 to 141 kN), it is possible to prevent the increase in loss due to the shrinkage at low temperature while securing a lateral pressure intensity of the cable.

Second Embodiment

An optical fiber cable 1A according to a second embodiment will be described with reference to FIG. 4. In the second embodiment as well, in the same manner as that of the first embodiment, a relationship between the average linear expansion coefficient of the fibrous filler and the average linear expansion coefficient of the cable sheath is satisfied.

Figure 4:
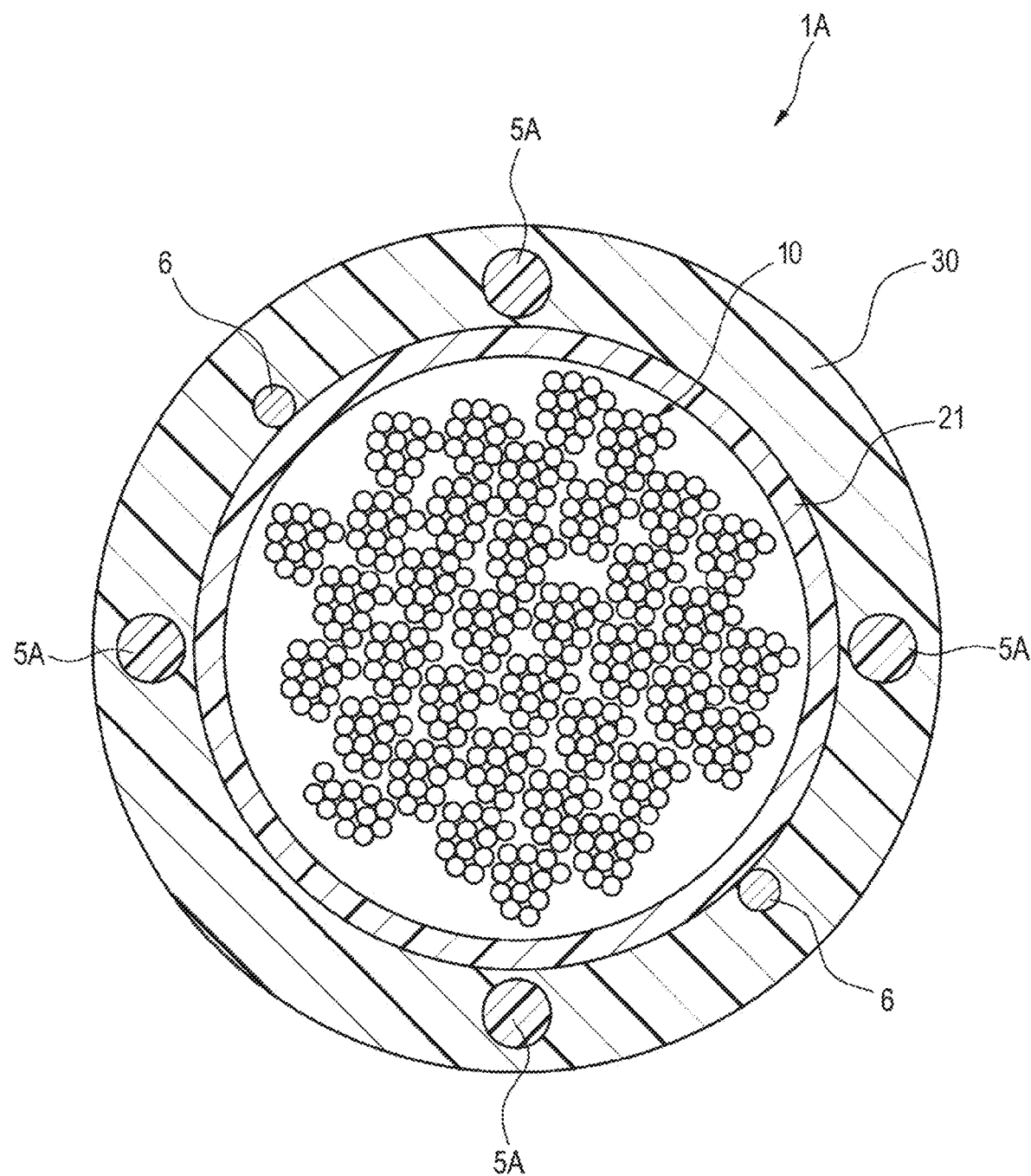
FIG. 4 is a cross-sectional view of an optical fiber cable according to a second embodiment of the present disclosure.

FIG. 4 is a cross-sectional view perpendicular to a length direction of the optical fiber cable 1A. As illustrated in FIG. 4, the optical fiber cable 1A includes the plurality of optical fiber ribbons 10, the water absorption tape (the wrapping tape) 21 that covers the periphery of the optical fiber ribbon 10, the cable sheath 30 that covers the periphery of the water absorption tape 21, and a tensile strength member 5A and a tear string 6 provided inside the cable sheath 30. In the second embodiment as well, in the same manner as that of the first embodiment, the tensile strength member 5A and the tear string 6 are both fibrous fillers.

For example, the water absorption tape 21 is longitudinally wrapped or spirally wrapped around the whole periphery of the plurality of optical fiber ribbons 10. For example, the water absorption tape 21 is formed by performing water absorption processing on a base fabric made of polyester or the like by attaching water absorption powder to the base fabric.

The cable sheath 30 is formed of, for example, resin such as polyethylene (PE) or the like. It is desirable that the resin of the cable sheath 30 has the Young's modulus of 500 Pa or more. It is desirable that the cable sheath 30 contains a silicone-based release agent. For example, it is desirable that the silicone-based release agent is contained therein in a proportion of 2 wt % or more. The cable sheath 30 is, for example, thermoplastic resin, and is formed by extruding resin with respect to the plurality of optical fiber ribbons 10 around which the water absorption tape 21 is wrapped.

The tensile strength member 5A is provided to be embedded inside the cable sheath 30. The tensile strength member 5A is formed of the fiber reinforced plastic (FRP). The tensile strength member 5A is, for example, an aramid FRP, a glass FRP, a carbon FRP, or the like, and desirably uses the aramid FRP having excellent flexibility. Since the linear expansion coefficient of the aramid FRP is smaller than that of the cable sheath 30, it is possible to prevent the shrinkage of the cable sheath 30 at a low temperature. The tensile strength member 5A is formed in a circular shape in a cross-sectional view. A plurality of tensile strength members 5A (4 in this example) are provided therein. Regarding each of the four tensile strength members 5A, two pairs of two tensile strength members 5A paired with each other at positions facing each other with a center of the optical fiber cable interposed therebetween in a cross-sectional view are provided. The positions of the four tensile strength members 5A in the cross-sectional view are positions where two straight lines respectively connecting the two paired tensile strength members 5A are orthogonal to each other. Each tensile strength member 5A is provided in the cable sheath 30 along a longitudinal direction of the optical fiber cable 1A.

The tear string 6 is used to tear the cable sheath 30, and is embedded in the cable sheath 30 along the longitudinal direction of the optical fiber cable 1A. In the case of the present example, two tear strings 6 are provided. The two tear strings 6 are provided to face each other at approximately intermediate positions of the adjacent tensile strength members 5A. By pulling out the tear string 6, the cable sheath 30 is torn in the longitudinal direction, and the optical fiber ribbon 10 can be taken out. The tear string 6 is formed of, for example, a plastic material resistant to pulling (for example, polyester).

In the optical fiber cable 1A having the above-described configuration, a ratio of a total cross-sectional area of the four tensile strength members 5A to a cross-sectional area of a member forming the cable sheath 30 is 2.4% or more. For example, in a case where four aramid FRPs having an outer diameter of 0.5 mm are inputted into a sheath having an outer diameter of 10 mm and a sheath thickness of 1.2 mm, the ratio of the total cross-sectional area of the four tensile strength members 5A to the cross-sectional area of the member forming the cable sheath 30 is 2.42%. According to the above-described structure, since a loss temperature characteristic at −30° C. to +70° C. is 0.1 dB/km or less, it is desirable that the ratio of the total cross-sectional area of the four tensile strength member 5A to the cross-sectional area of the member forming the cable sheath 30 is 2.4% or more.

In a case where the optical fiber ribbons 10 are housed in the optical fiber cable 1A, the optical fiber ribbons 10 are in a state of being rounded and assembled. The plurality of optical fiber ribbons 10 may be stranded to form a unit, and a plurality of units may be in a state of being assembled. The plurality of optical fiber ribbons 10 in the assembled state may be bundled with a bundle material or the like, or may be bundled with a bundle material or the like for each unit.

In the optical fiber cable 1A, two pairs of the two tensile strength members 5A paired with each other at the positions facing each other with the center of the optical fiber cable 1A interposed therebetween in the cross-sectional view are provided inside the cable sheath 30. That is, the optical fiber cable 1A is provided with the four tensile strength members 5A inside the cable sheath 30. The positions of the four tensile strength members 5A in the cross-sectional view are the positions where the two straight lines respectively connecting the two paired tensile strength members 5A are orthogonal to each other. Since the four tensile strength members 5A are provided inside the cable sheath 30 in a well-balanced manner, it is possible to suppress bending anisotropy (bias in a bendable direction) of the optical fiber cable 1A. According to the above-described configuration, an optical fiber cable having bending rigidity suitable for pneumatic feeding can be further obtained.

In the second embodiment as well, the average linear expansion coefficient of the fibrous filler at −40° C. to +70° C. is made to be smaller than the average linear expansion coefficient of the cable sheath at −40° C. to +70° C., thereby making it possible to prevent the increase in loss due to the shrinkage at low temperature.

Third Embodiment

An optical fiber cable 1B according to a third embodiment will be described with reference to FIG. 5. The same configurations as those of the optical fiber cable 1A according to the second embodiment will be denoted by the same reference signs, and the description thereof will be omitted.

In the third embodiment as well, in the same manner as that of the first embodiment, the relationship between the average linear expansion coefficient of the fibrous filler and the average linear expansion coefficient of the cable sheath is satisfied.

Figure 5:
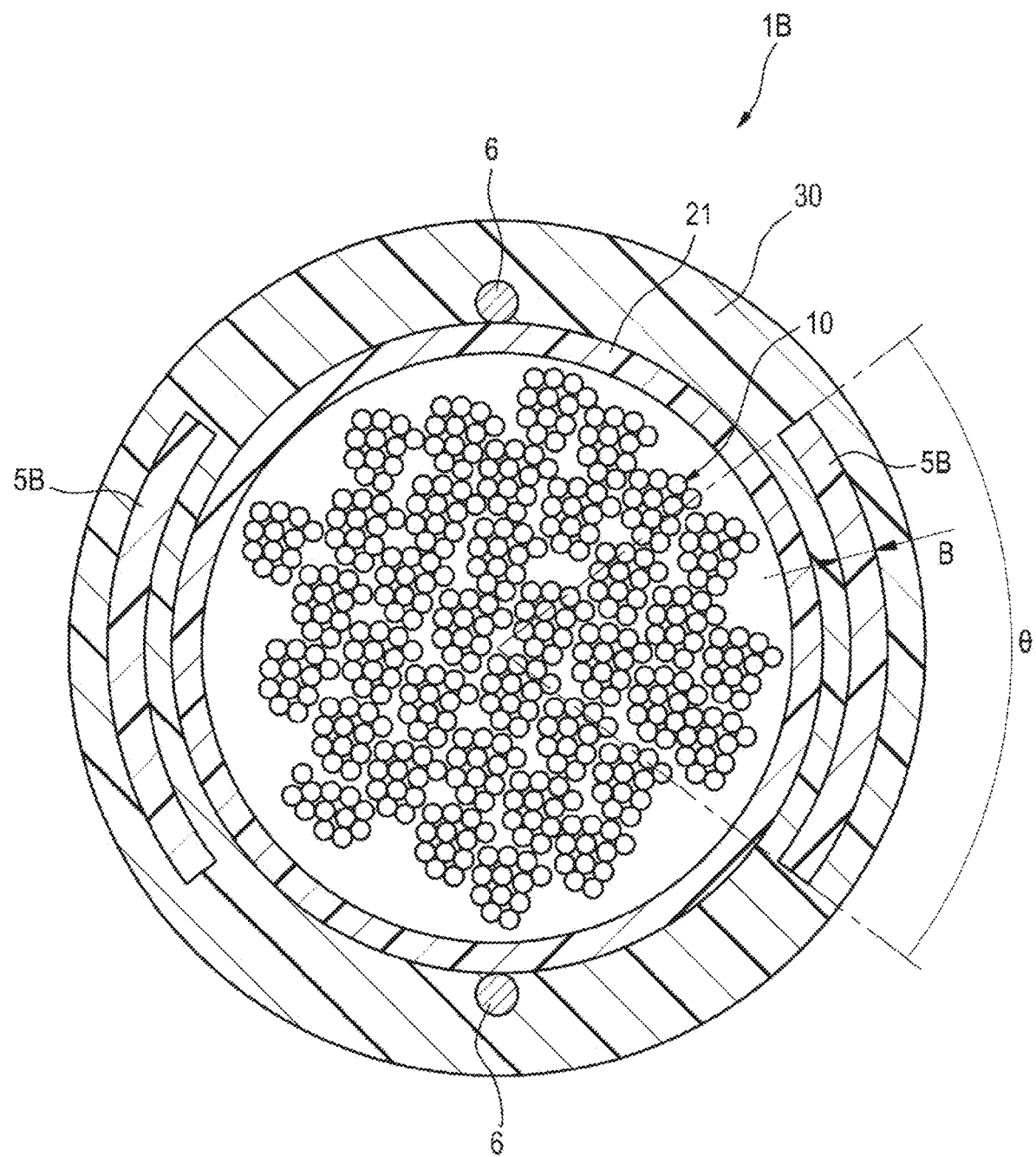
FIG. 5 is a cross-sectional view of an optical fiber cable according to a third embodiment of the present disclosure.

FIG. 5 is a cross-sectional view perpendicular to a length direction of the optical fiber cable 1B. As illustrated in FIG. 5, the optical fiber cable 1B includes the plurality of intermittently connected optical fiber ribbons 10, the water absorption tape 21 that covers the periphery of the optical fiber ribbon 10, the cable sheath 30 that covers the periphery of the water absorption tape 21, and a tensile strength member 5B and the tear string 6 provided inside the cable sheath 30. The tensile strength member 5B is a plate-shaped tensile strength member whose cross section is formed in a circular arc shape along a curved surface of the cable sheath 30. In the third embodiment as well, in the same manner as that of the first embodiment, the tensile strength member 5B and the tear string 6 are both fibrous fillers.

A plurality of tensile strength members 5B (two in this example) are provided. The two tensile strength members 5B are provided inside the cable sheath 30 and are arranged to face each other. For example, the tensile strength member 5B is provided in a circular arc shape in which a central angle θ of the optical fiber cable 1B is in a range of 30 degrees to 90 degrees. A total cross-sectional area of the two tensile strength members 5B is 2.4% or more of the cross-sectional area of the member forming the cable sheath 30. A thickness B in a radial direction of the tensile strength member 5B is adjusted according to a length of the circular arc of the tensile strength member 5B provided along the curved surface of the cable sheath 30. The tensile strength member 5B is a plate-shaped member formed of fiber reinforced plastic such as aramid, glass, or the like, and in the same manner as that of the tensile strength member 5A of the second embodiment, the tensile strength member 5B is provided along a longitudinal direction of the optical fiber cable 1B. Other configurations are the same as those of the optical fiber cable 1A.

According to the optical fiber cable 1B of the third embodiment, when viewed from a center of the optical fiber cable 1B, the two tensile strength members 5B are embedded over a large angle in the cable sheath 30 (for example, a central angle θ=30 degrees to 90 degrees). Therefore, the optical fiber cable 1B can further suppress the bending anisotropy as compared with a case of an optical fiber cable having a structure in which tensile strength members having a circular shape in a cross-sectional view are provided on opposite sides of a sheath. Rigidity of the optical fiber cable 1B can be appropriately increased. As a result, an optical fiber cable suitable for pneumatic feeding can be obtained.

In the third embodiment as well, the average linear expansion coefficient of the fibrous filler at −40° C. to +70° C. is made to be smaller than the average linear expansion coefficient of the cable sheath at −40° C. to +70° C., thereby making it possible to prevent the increase in loss due to the shrinkage at low temperature.

Fourth Embodiment

An optical fiber cable 1C according to a fourth embodiment will be described with reference to FIG. 6. The same configurations as those of the optical fiber cable 1A according to the second embodiment will be denoted by the same reference signs, and the description thereof will be omitted.

In the fourth embodiment as well, in the same manner as that of the first embodiment, the relationship between the average linear expansion coefficient of the fibrous filler and the average linear expansion coefficient of the cable sheath is satisfied.

Figure 6:
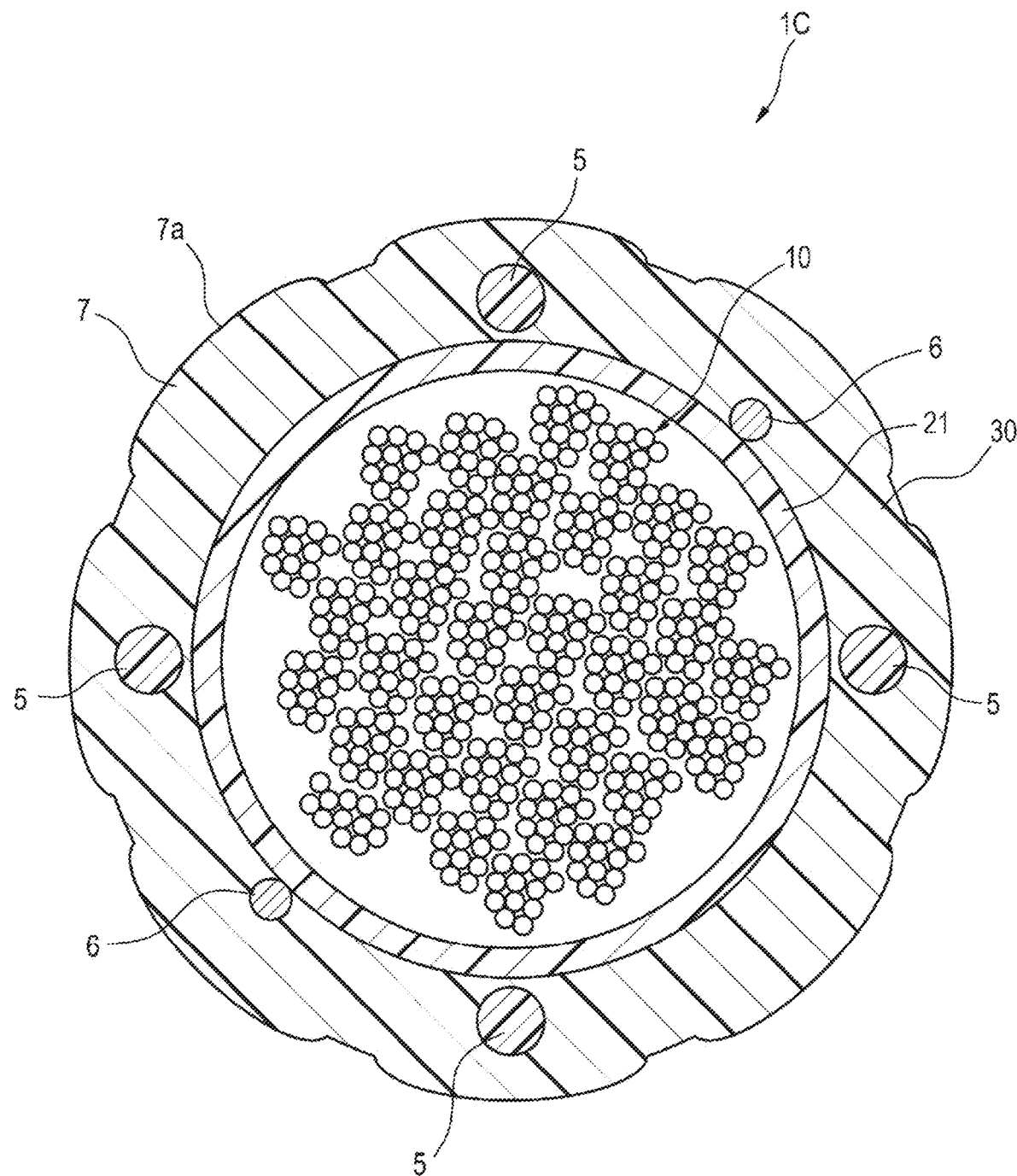
FIG. 6 is a cross-sectional view of an optical fiber cable according to a fourth embodiment of the present disclosure.

FIG. 6 is a cross-sectional view perpendicular to a length direction of the optical fiber cable 1C. As illustrated in FIG. 6, the optical fiber cable 1C includes the plurality of intermittently connected optical fiber ribbons 10, the water absorption tape 21 that covers the periphery of the optical fiber ribbon 10, the cable sheath 30 that covers the periphery of the water absorption tape 21, and a tensile strength member 5 and the tear string 6 provided inside the cable sheath 30. The tensile strength member 5 is illustrated as a tensile strength member similar to the four tensile strength members 5A having the circular shape in the cross-sectional view in the optical fiber cable 1A according to the second embodiment, and may be similar to the two tensile strength members 5B having the plate shape in the cross-sectional view in the optical fiber cable 1B according to the third embodiment. In the fourth embodiment as well, in the same manner as that of the first embodiment, the tensile strength member 5 and the tear string 6 are both fibrous fillers.

The optical fiber 1C includes a protrusion 7 on an outer peripheral portion of the cable sheath 30.

A plurality of protrusions 7 (8 in this example) are provided. The eight protrusions 7 are provided along a longitudinal direction of the optical fiber cable 1C. Each protrusion 7 may be continuously or intermittently provided along the longitudinal direction thereof. The eight protrusions 7 are provided on an outer peripheral portion of the cable sheath 30 at an approximately equal space in a cross-sectional view. The protrusion 7 is formed such that an end portion 7a in a direction in which the protrusion 7 protrudes is configured to have a curved surface and a curvature radius of the curved surface is 2.5 mm or more. The protrusion 7 is formed to be integrated with the cable sheath 30 by extrusion molding. Other configurations are the same as those of the optical fiber cable 1A.

According to the optical fiber cable 1C of the fourth embodiment, the plurality of protrusions 7 are provided on the outer peripheral portion of the cable sheath 30 along the longitudinal direction of the optical fiber cable 1C. Therefore, in a case where the optical fiber cable 1C is pneumatically fed into the duct, the protrusion 7 contacts an inner wall of the duct, so that a contact area between the cable sheath 30 and the duct can be reduced. As a result, friction between the cable sheath 30 and the duct is reduced, thereby making it possible to extend a pneumatically feeding distance.

In the fourth embodiment as well, the average linear expansion coefficient of the fibrous filler at −40° C. to +70° C. is made to be smaller than the average linear expansion coefficient of the cable sheath at −40° C. to +70° C., thereby making it possible to prevent the increase in loss due to the shrinkage at low temperature.

According to the optical fiber cable 1C, the protrusion 7 is formed such that the end portion 7a in the direction in which the protrusion 7 protrudes is configured to have the curved surface, and the curvature radius thereof becomes a gentle shape of 2.5 mm or more. As a result, for example, when the optical fiber cable 1C is inserted into a wiring member such as a closure or the like, it is possible to prevent occurrence of a gap caused by unevenness of the protrusion 7 between an insertion hole of the closure and an outer periphery of the optical fiber cable 1C, so that deterioration in airtightness of the closure can be prevented. Therefore, water intrusion into the closure or the like can be prevented.

Hereinabove, while the present disclosure has been described in detail and with reference to specific embodiments, it is apparent to those skilled in the art that various changes and modifications can be made without departing from the spirit and scope of the present disclosure. The number, position, shape, or the like of the above-described components are not limited to the embodiments, and can be changed to the number, position, shape, or the like in performing the present disclosure.

REFERENCE SIGNS LIST 1, 1A, 1B, 1C: optical fiber cable
10: intermittent ribbon
11: optical fiber 12: connecting portion
13: non-connecting portion
20: cable core
21: wrapping tape
30: cable sheath
31: first fibrous filler
32: second fibrous filler
5, 5A, 5B: tensile strength member
6: tear string
7: protrusion

The invention claimed is:

1. An optical fiber cable comprising:
   a cable core;
   a cable sheath placed around an outside of the cable core;
   a plurality of intermittently connected optical fiber ribbons inside the cable core; and
   a plurality of pairs of fillers in two diagonal directions orthogonal to each other in a cross-sectional view of the cable sheath,
   wherein a fibrous filler or an FRP using the fibrous filler is arranged on at least one pair of diagonals of the fillers,
   wherein an average linear expansion coefficient of the fibrous filler at −40° C. to +70° C. is smaller than an average linear expansion coefficient of the cable sheath at −40° C. to +70° C. and
   wherein ES product obtained by multiplying Young's modulus E of the cable sheath by a cross-sectional area S of the cable sheath is 12.9 to 141 kN.

2. The optical fiber cable according to claim 1,
   wherein the average linear expansion coefficient of the fibrous filler at −40° C. to +70° C. is less than $1 \times 10^{-5}$/° C.

3. The optical fiber cable according to claim 1,
   wherein a part or all of the fibrous fillers have a negative linear expansion coefficient.

4. The optical fiber cable according to claim 1,
   wherein a part or all of the fibrous fillers are at least any one of an aramid fiber, a liquid crystal polymer, and a glass fiber.

5. The optical fiber cable according to claim 1,
   wherein the average linear expansion coefficient of the cable sheath at −40° C. to +70° C. is $4.5 \times 10^{-4}$/° C. or less.

6. The optical fiber cable according to claim 1,
   wherein a thickness of the cable sheath is 0.5 mm or more.

7. The optical fiber cable according to claim 1,
   wherein the number of fibrous fillers is 4 or more,
   wherein two pairs of the two fibrous fillers paired at positions facing each other with a center of the optical fiber cable interposed therebetween in the cross-sectional view are provided, and
   wherein the positions of the four fibrous fillers in the cross-sectional view are positions where two straight lines respectively connecting the two paired fibrous fillers are orthogonal to each other.

8. The optical fiber cable according to claim 7,
   wherein a ratio of a total cross-sectional area of the fibrous fillers to a cross-sectional area of a member forming the cable sheath is 2.4% or more.

9. The optical fiber cable according to claim 1,
   wherein the fibrous filler is a plate-shaped member in which a cross section of the fibrous filler is formed in a circular arc shape along a curved surface of the cable sheath.

10. The optical fiber cable according to claim 9,
    wherein a ratio of a total cross-sectional area of the fibrous filler to a cross-sectional area of a member forming the cable sheath is 2.4% or more.

11. The optical fiber cable according to claim 1,
    wherein the cable sheath includes a protrusion protruding in a radial direction of the optical fiber cable at an outer peripheral portion of the cable sheath.

12. The optical fiber cable according to claim 11,
    wherein an end portion of the protrusion in a direction in which the protrusion protrudes is configured to have a curved surface, and
    wherein a curvature radius of the curved surface is 2.5 mm or more.

13. The optical fiber cable according to claim 1,
    wherein the optical fiber cable is used as a pneumatic feeding cable.

\* \* \* \* \*